E. W. TURNER & H. S. REAMS.
MACHINE FOR MAKING CLOTHES PINS.
APPLICATION FILED MAY 17, 1909.

1,109,948.

Patented Sept. 8, 1914.
4 SHEETS—SHEET 3.

WITNESSES:
Ralph Warnken
Joseph B. Beam

INVENTORS
Edward W. Turner and Herman S. Reams
BY
Stuart & Stuart
ATTORNEYS

UNITED STATES PATENT OFFICE.

EDWARD W. TURNER AND HERMAN S. REAMS, OF RICHMOND, VIRGINIA, ASSIGNORS TO RICHMOND CEDAR WORKS, OF RICHMOND, VIRGINIA, A CORPORATION OF VIRGINIA.

MACHINE FOR MAKING CLOTHES-PINS.

1,109,948. Specification of Letters Patent. Patented Sept. 8, 1914.

Application filed May 17, 1909. Serial No. 496,401.

*To all whom it may concern:*

Be it known that we, EDWARD W. TURNER and HERMAN S. REAMS, citizens of the United States of America, residing at Richmond, county of Henrico, State of Virginia, have invented certain new and useful Improvements in Machines for Making Clothes-Pins, of which the following is a specification.

This invention relates to an automatic machine for making clothes pins and has as an object the improvement of such machine whereby the certainty of its operation, its output, the quality of its work, and, therefore, its efficiency are greatly increased.

The machine to which our invention has been applied, described in general terms, consists of a shaping cutter, a slotting cutter, and an intermittently moving carrier having seats for blanks. The pin blanks are placed each in a seat on the carrier and each remains in its seat until the operation of making the pins is completed. The carrier presents the blanks to the shaping cutter. They are engaged by a live and a dead center, rotated in contact with the shaping cutter from which they receive the desired form, and released by the centers and carried on to the slotting cutter where they are clamped and slotted. The clamp is released as soon as slotting is completed and the pin moves forward, still in its seat, until it is over a receptacle into which it is dropped. The invention relates to a number of mechanisms which will be referred to in the order in which they are brought into action in the operation of the machine.

In accordance with this invention, a reciprocating member, called a "plunger," is provided adjacent the end of the belt. The blanks are supplied to the belt and rest thereon in a line extending out on to the plunger which supports the forward blanks of the line. A presser is also provided which reciprocates vertically. At each reciprocation of the plunger, a blank is released, and as the presser descends the blank is pushed into the path of the plunger. As the plunger advances, it engages the blank and moves it to the carrier, thus giving a positive feed to the blanks by which they can be handled as fast as desired without danger of the misplacing of a single blank.

For the purpose of preventing the accumulation of dust and shavings which would clog the seats and make it difficult to place the blanks in the carrier in operative position, pneumatic gathering means have been provided. This device consists of a hood or housing for the shaping cutter, open toward the carrier, and suitable means for exhausting the air from the hood. It was found that this device, while quite effective for the purpose intended, had a tendency to displace the blanks on the carrier adjacent the one being cut. It will be noted that the carrier is in the form of a hollow cylinder and that the seats are provided with slots which extend to the inside of the cylinder. To further provide for the removal of dust, to counteract the tendency of the pneumatic gatherer just described to remove the blanks from the seats and to assist in feeding blanks to the seats, a second pneumatic gatherer is placed inside the carrier with its mouth beneath the seats which are covered by the first gatherer. The mouth of the second gatherer also extends beneath the seat which is in feeding position; *i. e.*, receiving the blanks being fed. In this way, the air pressure on the blanks is neutralized and the tendency on the part of the upper gatherer to displace them wholly counteracted to the extent that the pneumatic gathering device beneath the seats operates as a means for holding the blanks in their seats and assists in feeding the blanks to the carrier.

In shaping the pins, the cutter rotates at a high speed and the draft thus caused, together with the flying chips, tends to displace the blanks in the seats adjacent the one occupied by the blank being shaped. The pneumatic device just referred to serves to partly overcome this tendency. As a further means to this end, the invention provides a clamping device which operates during the shaping of each blank to hold in position the blanks adjacent the one being shaped. Thus, at each stop of the carrier, one blank is engaged for shaping and the blanks adjacent thereto are engaged by a clamping device. When shaping is completed and the carrier is about to start, the blanks adjacent the one just shaped are released and they move on independently of the clamps.

During shaping, the blanks are held and rotated between a live center and a shiftable center. The latter is actuated to slide in the direction of its axis toward the live center and clamp the blanks between the two. The live center, as will be understood from the term applied to it, is constantly rotated and as the blank which is loose in the seat approaches the rotating center, propelled by the shiftable center, there is danger of some projecting chip on the blank being engaged by the rotating center, whereby the blank will be displaced before it is clamped, and so caused to be clamped off center. To prevent such displacement of the blank and hold it in alinement as it approaches the live center, a pin is mounted in the live center with its axis coincident with that of the center to slide in the direction of the axes of both. This pin normally projects from the center and the recess in which it is mounted is sufficient to allow it to be completely withdrawn within the center. A spring in the recess maintains the pin in the position referred to as normal. The pin is pointed at its outer extremity and this point comes first in contact with the end of the pin blank as the latter approaches the live center, moved along the seat by the shiftable center.

The spring yields as the blanks advance and the latter is held in position by the pin, properly centered, and in that position engaged by the live center. This pin also serves an important function as a means for disengaging the blanks from the live center when shaping is complete. For the purpose of ejecting finished pins from the seats, a cam surface is provided which overlies the surface of the carrier and is inclined in a cylindrical plane. This cam surface is in the path of the ends of the pins, stationary and back of the position of the last operation. As the pins come into contact with this surface, they are moved in the direction of their length, each pin sliding along its seat until it projects therefrom a sufficient distance to be engaged by another cam surface in the path of the displaced pins. This surface is inclined outward in a plane transverse to the axis of the cylinder. By this means, the pins are lifted from their seats and fall, to be collected in a suitable receptacle.

Sufficient of a machine for making clothes pins to show the application of our invention is illustrated in the accompanying drawings of which,—

The machine consists of a frame 1 upon which is mounted an intermittently rotating carrier 2, a shaping cutter 4, with means whereby it is oscillated toward and from the carrier and rotated, and a slotting cutter 3, also mounted to oscillate toward and from the carrier and to rotate. The carrier 2 is rigidly mounted on the shaft 5 journaled in the frame of the machine and extending transversely thereof. This shaft is driven intermittently by means of a toothed wheel 6 mounted thereon and secured to the shaft. This wheel is engaged by a segmental worm 7 mounted on the cam shaft 8. The toothed wheel 9 is secured to the shaft 8 and meshes with a smaller toothed wheel 10 mounted on an idler shaft 11 journaled on the frame of the machine. A pulley 12 is secured to the other extremity of this shaft. A belt 14 runs over this pulley and a pulley 15 on the main shaft 16 which is driven by a suitable belt from a counter shaft not shown, said belt running over the drive pulley 17 on the main shaft. The carrier, or carrier drum, as it will be hereinafter termed, shown in detail in Figs. 3, 4 and 5, consists of a hollow cylinder having at one end the web or spokes 20 transverse to the axis. The hub 21 which is integral with the web is mounted on and rigidly secured to the shaft 5, as previously described. The outer cylindrical surface of the drum is grooved as shown to form seats 22 for the blanks, the grooves being substantially semi-circular, in cross-section, and of a diameter slightly greater than that of the pins which it is desired to make. These grooves are preferably parallel to the axis of the conveyer cylinder or drum and equally spaced from each other. Each groove or seat 22 is connected to the inside of the drum by a slot 23 extending from the edge of the cylinder which is remote from the web 20 toward the web. These slots are preferably centrally placed in each groove and in a radial axial plane of the cylinder. They are of a width in excess of the width of the slots to be made in the pins and are enlarged adjacent their mouths 24 to admit the cutter which is formed to make a correspondingly shaped slot in the pins.

The shaping cutter 4 to which the blanks are presented first after being deposited upon the carrier consists of a series of blades 25 shaped to give the desired form to the blank and mounted upon a head 26. This head is secured to a shaft 27 journaled in the swinging frame 28. A quarter turn belt 30 (see Fig. 1) passes over pulley 29 on this shaft and the pulley 31 on the main shaft 16. The swinging frame 28 is journaled at its lower extremity in suitable bearings 32 on the frame of the machine. The lever 33 is pivoted intermediately at 34 and carries at one extremity a cam follower 35 which coöperates with the cam 36 on the cam shaft 8, and at its other extremity is pivotally secured to a connecting rod 37 which is pivotally attached at its other extremity to the frame 28. A spring 70 maintains the follower in contact with the cam. The spring 70 encircles the rod 71 which is pivotally attached to the lever 33 and passes through the guide 68 attached to the frame of the machine. This spring is in compression, and bears against the guide 68 and against the shoulder 18 on the rod 71. By this means motion of the cam 36 is communicated to the cutter 4 moving it toward and from the carrier 2; at the same time, the cutter is continuously rotated, the power being transmitted from the main shaft as described.

Figure 1:
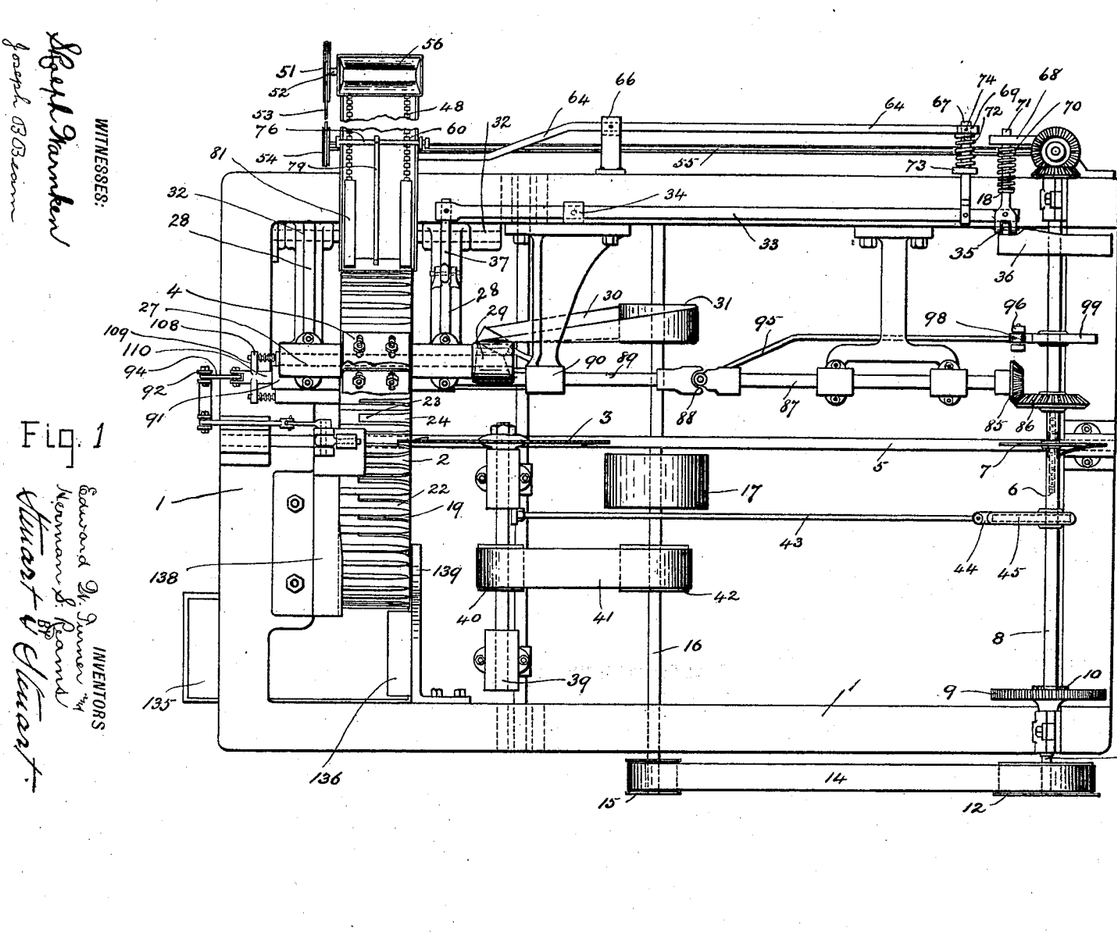
Figure 1 is a plan of the machine.

The slotting cutter 3 is journaled on an oscillating frame 39 (see Fig. 1). A pulley 40 is mounted on the shaft and the belt 41 passes over this pulley and a pulley 42 on the main shaft 16. Oscillatory motion is communicated to the frame 39 by means of the connecting rod 43 to which is connected the strap 44 of the eccentric 45 rigidly mounted on the cam shaft 8.

The operation of the elements described is quite apparent. Each cutter is rotated continuously. One oscillation of each cutter, whereby it engages the work, takes place during each complete step of the carrier. The pins on the carrier, as they advance, are first shaped and then slotted, each operation being performed on a different blank at each step of the carrier and each oscillation of the cutters.

Figure 2:
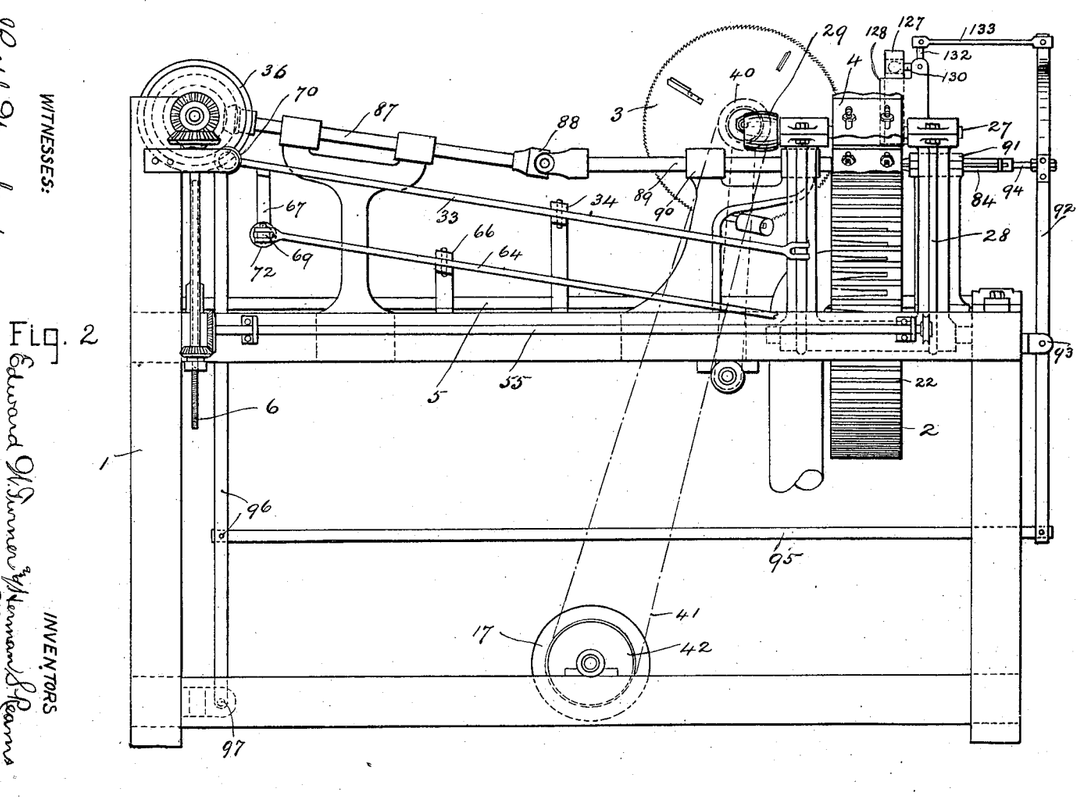
Fig. 2 is an elevation of the machine from the feed side, with the feed mechanism removed.
Figures 3, 4, 5, 6, 7:
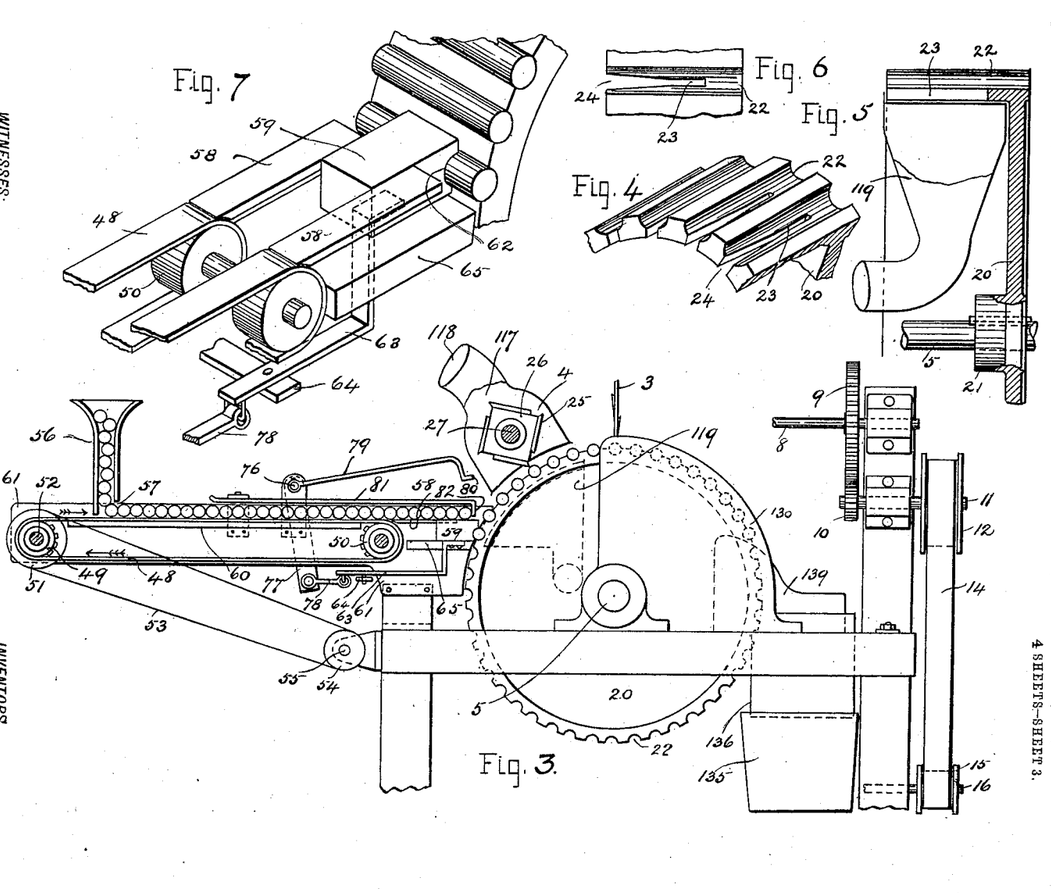
Fig. 3 is a detail of the feed mechanism and carrier.
Fig. 4 shows a part of the rim of the carrier in perspective.
Fig. 5 is a broken section through the rim of the carrier.
Fig. 6 shows in plan one of the slotted seats in the carrier.
Fig. 7 is a view in perspective of a part of the feed mechanism.

An endless conveyer 48 is mounted on gears 49 and 50 journaled in suitable brackets, (see Fig. 3). This conveyer is driven by the large pulley 51 mounted on the shaft 52 of the sprockets 49. A belt 53 passes over the pulley 51 and a small pulley 54 mounted on a horizontal shaft 55 connected by a suitable train of bevel gears to the cam shaft 8, (see Figs. 1 and 2). A hopper 56 having a vertical outlet at 57 opening on to the upper surface of the conveyer belt is mounted on suitable brackets on the frame of the machine. It will be noted that the conveyer 48 terminates an appreciable distance from the carrier. As shown, this distance is equal to about six times the diameter of the pin blanks in use, though it may be varied according to the judgment of the designer. To support the pins immediately beyond the conveyer chains, ways 58 are provided, the upper surfaces of the ways being continuous with the upper surface of the conveyer belt. These ways are shown clearly in detail in Fig. 7, which is a perspective of the end of the conveyer chains, the ways and the plunger 59, to be described.

In the embodiment of our machine shown, the conveyer consists of two chains or belts which run in grooves in a supporting table 60. This table is normally substantially horizontal, though its angle is adjustable by means which it is thought unnecessary to describe. The chains are spaced apart a distance depending on the length of the blanks to be used. The ways 58 consist of two parallel flat bars which, as previously described, have their upper surfaces continuous with the upper surface of the belt. These bars are secured to the side frames 61 and are, as stated, alined with the chains of which the conveyer belt is composed, though they may be otherwise placed. Between the ways 58, mounted to slide relatively thereto, is a plunger 59, the flat upper surface of which is parallel to the top surface of the ways 58 and the belt 48. This plunger extends beyond the ends of the ways, is grooved transversely along its front surface at 62 to engage the pin blanks and is connected by means of the L-shaped arms 63 to the end of the lever 64. The upright arm of the L is secured at its upper extremity to the plunger and the horizontal arm is swiveled to the lever 64. The plunger slides upon the table 65 which is slotted for the passage of the arm. The lever 64 is pivotally mounted at 66 (see Fig. 1) near its central point on the frame of the machine, and is oscillated about its center by means of the cam 36. As previously described, this cam gives to the lever 33 an oscillatory motion about the center 34. This motion is communicated to the lever 64 by means of the flat connecting rod 67 pivotally connected at one extremity to the lever 33. The connecting rod 67 is connected at 69 by means of a pin and slot to the extremity of the lever 64. A spring 72 is interposed between the extremity of the lever 64 and a shoulder 73 on the rod 67. This is a spiral compression spring, as shown, and serves to maintain the pin 74 carried by the lever 64 normally at the outer end of the slot 75 of the connecting rod 67 (see Fig. 8). The spring 72 and the slot and pin connection 75 provide for yielding between the cam 36 and the plunger.

Journaled in suitable brackets on the frame of the machine above the conveyer and extending transversely thereto is a rock shaft 76 also actuated by lever 64. A depending arm 77 secured to one extremity of the rock shaft is connected by means of the link 78 to arm 63, (see Figs. 3 and 7). One extremity of the presser arm 79 is secured to the rock shaft 76 near its central point. The forward extremity of the presser arm is provided with a presser foot 80 which is over the plunger in its forward position.

It should be noted that as the lever 64 oscillates, reciprocating the plunger 59 in a horizontal plane, its oscillation is communicated to the shaft 76, causing it to rock and reciprocate the presser foot 80 vertically. Further, it should be noted that the path of the foot 80 approaches the path of the plunger 59, and that the members 59 and 80 are so timed that as the plunger is withdrawn, the presser foot moves downward toward its path. Overlying the conveyer belt at each side and spaced from the table 60 a distance sufficient to permit the passage of the blanks, are two retaining guides 81, each in the form of a flat bar. At their forward extremities, these bars are bent down at right angles forming stops 82 which extend nearly down to the plane of the top of the plunger.

In the operation of the feed, the hopper 56 is supplied with blanks which move down into the outlet 57 propelled by gravity. It will be noted that the side of the outlet toward the carrier terminates above the table 60 a sufficient distance to permit passage of a blank of the size shown. The conveyer belt is driven in the direction of the arrows so that during the operation of the feed, each blank as it reaches the surface of the table is moved forward between the guides 81 and the table and conveyer, forming a continuous line extending to the stops 82. The friction of the numerous blanks on the belt is sufficient to propel those in advance of it when they reach the ways 58 and the plunger, so that the line is maintained continuous up to the stops, those at the forward extremity being supported by the plunger. When the plunger is withdrawn as described, the support is removed from the forward blank. The presser 80, so timed as to move downward at this time, as previously described, pushes the blank into the path of the plunger, at which period it rests on the table 65. The presser is immediately withdrawn and the plunger advances, engaging the blank and depositing it in one of the seats 22 of the carrier. The latter is so timed as to bring a seat into line with the plunger 59 at each step. If for any reason the blank is not properly placed, yielding occurs between the lever 64 and its cam, as previously described.

Figures 8, 9:
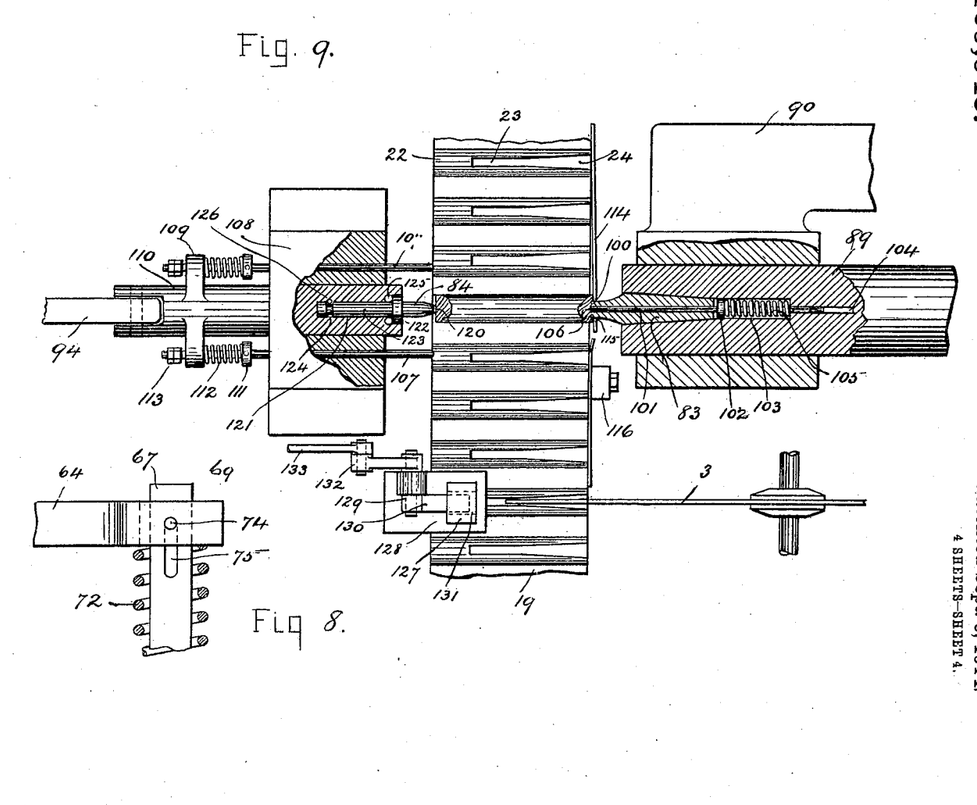
Fig. 8 is a detail of a connection between two of the operating levers.
Fig. 9 is a detail, in plan, and partly in section, showing the blank centering means, the slotting means, and other features of the machine.

Adjacent the path of the carrier seats 22 at the point where the path of the shaping cutter 4 in its oscillation approaches nearest to the path of the seats are the live center 83 and the shifting center 84 (see Fig. 9). These are so placed that at each step of the carrier the axis of a seat 22 is made to coincide with the axis of the centers. The live center is driven in continuous rotation by means of the bevel gear 85 which meshes with a bevel gear 86 on the cam shaft 8. The shaft 87 of the bevel gear 85 is mounted in suitable bearings and connected by means of a universal joint 88 with the stock 89 of the live center. This stock is journaled in bearing 90 supported by a bracket on the frame of the machine, (see Fig. 1).

The stock 110 of back or shifting center 84 is mounted in a bearing 91 on the frame of the machine to slide in the direction of the common axis of the two centers. The motion of a substantially vertical lever 92 pivoted intermediately of its length at 93 to the frame of the machine (see Fig. 2), is communicated to this center by means of a connecting rod 94 at the upper extremity of the lever. A substantially horizontal rod 95 is pivotally connected to the lower end of the lever 92 and extends through the machine to a point beneath the cam shaft 8 where it is pivotally connected to a follower rod 96. The latter is mounted on a stud 97 below, on the frame of the machine to swing in a vertical plane and carries at its upper extremity a roller 98 which engages a cam 99 mounted on the cam shaft 8 (see Fig. 1). The centers are normally spaced apart a distance considerably greater than the length of a blank. The operative extremity of the live center is a slight distance to one side of the path of the ends of the blanks and the corresponding extremity of the dead center is a considerable distance to the other side of the other end of the blanks. The cam 99 is so timed that at each step of the carrier, as one of the seats 22 is brought into position with its axis coincident with that of the centers, the shiftable center 84 is advanced and moves the blank longitudinally toward the live center until it is engaged thereby and rotated between the centers.

The outer extremity of the live center 83 is provided with teeth 100 to engage the end of the blank. It frequently happens that the blank is roughened and fibers of wood project therefrom. These fibers sometimes come in contact with the teeth of the live center as the blank approaches and the rapidly rotating center throws the blank out of line so that it is either entirely displaced from the seat or clamped off center. To prevent this occurrence, the live center is provided with a sliding centering pin 101. The center is bored axially its full length and the pin is mounted in the bore. The pin exceeds the center in length by a considerable extent and a collar 102 is placed on the pin outside the center and adjacent its back end to limit the forward movement of the pin. The center is placed in the usual conical seat in the extremity of the stock 89 and the shaft is counter bored beyond the seat to form a chamber 103. The rear end of the chamber is bored centrally at 104 to admit the extremity of the pin, and a spiral compression spring 105 encircles the extremity of the rod and rests at one end on the rear wall of the chamber 103 and at the other end bears against the collar 102. Normally, the extremity 106 of the pin which is pointed projects from the center, pressed outward by the spring 105 and limited in its outward motion by the collar 102. One function of this pin is to disengage blanks from the center when the cutting operation is finished; also, when a blank pushed by the live center engages the point of the centering pin 101, the pin is gradually moved backward against the tension of the spring 105 as the end of the blank approaches the live center. In this way, the blank is subjected to a preliminary clamping action by which it is centered as soon as engaged and held as it approaches the live center and prevented from being displaced by the rapidly rotating teeth 100 of that center when it first comes in contact with them. In Fig. 9, a blank is shown in position between the centers; the ends of the blank being broken away to show the ends of the centers.

During the shaping of the blanks, partly because of the draft created by the rapidly rotating cutter and partly due to the action of the flying chips thrown off by this cutter, the blanks adjacent that engaged by the live center are frequently displaced from their seats on the carrier. To prevent this action, the shiftable center is provided with clamping rods 107, one on each side of the center and spaced therefrom so that they are alined with the seats adjacent the seat which is in line with the centers. The rods 107 are mounted to slide in suitable bearings 108 and in a cross bar 109 rigidly mounted on the stock 110 of the back center. Each rod 107 is provided with a collar 111 and a spiral compression spring 112 encircles each rod between the collar 111 and the cross bar 108 (see Fig. 9). Lock nuts 113 on each rod limit the motion of each rod in response to the tension of the spring and thereby give it its normal position. A plate spring 114 is secured to the feed frame and extends along the extremities of the seats on the side of the carrier toward the live center. This spring forms a back rest or abutment for the blanks and is apertured at 115 to allow the live center to pass through it. A rigid rest or abutment 116 mounted on a suitable bracket secured to the frame of the machine is placed opposite the extremities of the seats beyond the live center.

As the back center moves forward before each shaping operation to engage the blank to be shaped and bring it in contact with the live center, the rods 107 engage each a blank on one side of the one between the centers, so the blanks on both sides are engaged. The blank in front of the one to be shaped is pressed against the yielding rest 114 and the one in the rear of the one in operative position is pressed against the rigid rest 116 and both blanks are held firmly during the shaping of the blank between, whereby their displacement is prevented. When the shaping operation is finished and the back center with its clamping rods 107 is withdrawn, the blanks on each side of the one just shaped are released and the blank which is in front of the one in operative position and the one just shaped are moved longitudinally along their seats by the spring 114 which has been slightly deflected by the clamping pressure and now recovers its normal position; in this way, the center is cleared.

To remove the necessity for indenting the ends of the blanks to receive the shiftable or back center 84, the latter is provided with a serrated or cupped surface 120 to engage the blanks and the center, and is mounted to rotate in its stock 110 and provided with anti-friction bearings. The stock 110 is bored centrally at 121 and the back center is provided with a collar 122 of such diameter that it will rotate freely within the bore 121 when it is supported concentrically therewith. Beyond the collar, the diameter of the centering pin 101 is reduced, forming a cylindrical shank 123, and the stock 110 is counter-bored to receive the shank, and the diameters of the bores and shank are such that the latter is permitted to revolve freely. A groove 124 encircles the shank 123. Balls 125 are placed between the collar 122 and the base of the bore 121. A pin 126 inserted rigidly in and through the stock 110 engages in the groove 124 to prevent displacement of the center 84. Thus, we have the thrust of the back center taken up by anti-friction bearings. It is permitted to rotate freely and the only resistance offered to the rotation of the blank by the live center is the slight resistance to rotation of the bearings of this pin.

The pneumatic gathering means by which the dust and shavings are removed from the neighborhood of the shaping cutter is an important feature of my invention. A hood 117 incloses the shaping cutter (see Fig. 3), and is open toward the carrier. An outlet is provided at 118 and to this a suitable pump or exhauster is connected. A second hood 119 is placed below the seats, the mouth of the hood being close to the inner surface of the carrier and extending from the entering position to and beyond the shaping position. Suitable connections are provided from this hood to the exhauster.

In the operation of the machine, the pneumatic system serves to remove saw-dust which collects around the blanks and clogs the seats. When a collector is used whereby the draft is applied to the blanks from but one direction only, it is found that the air pressure frequently displaces the blanks from their seats. To avoid this, to provide further facilities for the removal of dust and shavings, and draw the blanks into their seats as fed, a second collector is placed inside the carrier. This serves to compensate for the draft oppositely applied, assists the feed and prevents the removal of the blanks from their seats. The effect thus produced is so marked that the lower suction member serves as a means for holding the blanks in their seats.

It will be understood that each blank, after being shaped, is released by the live and dead centers 83 and 84, and finally by the second clamp 107; it remains in its seat and advances to the slotting cutter. The carrier stops as each seat comes in line with the slotting cutter, the seat being so placed that as the cutter swings forward, it enters the slot therein. In this position, it is necessary to hold each blank at one end. This is accomplished by means of a sliding jaw 127 which is caused to descend on each blank as it arrives opposite the slotting cutter and to hold it firmly in its seat during slotting. The jaw 127 is mounted to slide vertically in bearings 128 on the frame of the machine. The jaw is actuated by means of a bell crank lever 129, one arm 130 of which is horizontal in its middle position. The extremity of this arm engages the slot 131 in the jaw 127. The other arm 132 is pivotally connected at its extremity to the connecting rod 133 which is pivoted at its other extremity to the lever 92. The operation of this device is so apparent that it hardly needs description. As each seat on the carrier comes in line with the slotting cutter, the roller 98 encounters the high portion of the cam 99 whereby the upper extremity of the lever 92 is moved to the left, (see Fig. 2) the bell crank lever 129 rotates left-handed about its center, the arm 130 moves downward and the jaw 127 is depressed, engaging the blank. The cutter now swings forward, slots the blank in the seat, and is withdrawn. The cam 99 is so timed as to release the blank when it has been slotted. The carrier moves forward and the blank which has just been slotted, still in its seat, approaches the receptacle 135. A chute 136 which terminates just beneath the carrier leads to this receptacle, (see Figs. 1 and 3).

The pins are ejected from their seats by means of two stationary cams 138 and 139, (see Figs. 1 and 3). These are both placed in the path of the seats and an appreciable distance aft of the slotting position, the cam 138 being in advance of the cam 139. The former overlies the cylindrical surface of the carrier, extending transversely of the seats and placed close to the carrier surface. This cam is curved in a cylindrical plane from the path of the ends of the seats toward the path of their central portions, so that each pin, as it advances and comes in contact with the cam surface, is moved along in its seat so that it extends beyond the carrier on the side opposite to the cam 138. On this side of the carrier, in the path of the portions then caused to project, is the cam 139 which is curved in a plane at right angles to the axis of the carrier from a point just beneath each seat to a point a considerable greater radial distance from the axis of the carrier than are the seats. Each pin, as it is acted upon by the cam 138, is moved over so that its extremity comes in line with the cam 139, and as the carrier moves forward, the pins so displaced are engaged by the cam 139 and lifted from their seats. At this point, they fall onto the conductor 136 and slide into the receptacle 135.

The operation of the machine has been so far described in connection with its construction that further description thereof is thought to be unnecessary. Though specific details of construction have been carefully set forth in order that persons skilled in the art may build an operative machine of the form which is at present preferred, these details may be varied to a wide extent within the scope of our invention.

What we claim and desire to secure by Letters Patent is:

1. In a machine for making clothes pins, a cutter, a carrier to present the pin blanks to the cutter, means to conduct the blanks toward the carrier, a presser-foot mounted to reciprocate vertically, a plunger mounted below the path of the blanks to reciprocate longitudinally of the path of the blanks, and support the forward blanks and means for actuating the presser and the plunger whereby the latter is withdrawn and the presser pushes a blank downward into the path of the plunger and the latter engages the blank and presents it to the carrier.

2. In a machine for making clothes pins, a cutter, a carrier to present pin blanks to the cutter, ways to conduct the blanks toward the carrier, a support for blanks extending toward the carrier, a presser-foot mounted to reciprocate vertically past the end of the ways, a plunger mounted to reciprocate in the direction of the path of the blanks, projecting beyond the ways during part of its traverse so as to support the forward blanks, and means for actuating the presser and plunger whereby the blanks are moved by the presser into the path of the plunger and moved forward to the carrier, propelled by the plunger.

3. In a machine for making clothes pins, a cutter, a carrier having seats for blanks, means for moving the carrier to present the blanks to the cutter, ways upon which the blanks move toward the carrier, means for supplying blanks to the ways whereby they are formed in a line thereon, a stop for the blanks in line with those on the ways, spaced from the end of the ways by a distance greater than the diameter of a blank, a presser mounted to move vertically between the stop and the ways, a plunger mounted to move toward and from the carrier, and means for actuating the presser and the plunger.

4. In a machine for making clothes pins, a cutter, a carrier having seats, means for actuating the carrier to present the blanks to the cutter, ways, means for supplying blanks to the ways and moving them along the same, a support for the blanks extending from a point beneath the ways to a point adjacent the carrier, a stop beyond the ways spaced therefrom a distance greater than the diameter of a blank, a plunger mounted to reciprocate along the ways and extending, during part of its traverse, beyond the ways to support the forward blanks, and means for reciprocating the plunger whereby the blanks are dropped one at a time into its path and advanced into place on the carrier.

5. In a machine for making clothes pins, a cutter, a carrier and means for actuating the carrier to present the blanks to the cutter, ways, means for supplying blanks to the ways and moving them along the ways, a stop beyond the ways, a plunger mounted to reciprocate longitudinally of the ways and extending beyond the same to support the forward blanks, a presser mounted to move downward between the ways and stop, and means for reciprocating the plunger to release the blanks one at a time, and means for actuating the presser when the plunger is withdrawn to push the released blank downward into the path of the plunger.

6. In a machine for making clothes pins, a cutter, a carrier having seats for blanks, each seat having an opening to receive the cutter oppositely disposed to the receiving direction, and pneumatic means above and below the seats whereby the dust and shavings are removed and the blanks held in position.

7. In a machine for making clothes pins, a cutter, a carrier having seats for blanks, the seats slotted to permit the entrance of the cutter, means for actuating the carrier, means for actuating the cutter, and pneumatic gatherers above and below the blanks whereby the dust and shavings are removed and the blanks drawn into and held in position.

8. In an automatic machine for making clothes pins and the like, a tool, a carrier having seats for blanks, means for moving the carrier intermittently to bring the blanks into range of the tool, means for actuating the tool to slot the blanks, and means for holding each blank in its seat when opposite the tool, consisting of a jaw mounted to reciprocate, a bell crank lever pivoted adjacent the jaw, one arm engaging a slot in the jaw, a cam and follower, means for rotating the cam, and connections between the cam follower and the other arm of the bell crank lever whereby the jaw is closed on each pin as it comes into slotting position and opened when the slotting is completed.

9. In an automatic machine, a shaping cutter, a carrier having seats for blanks, means for moving the carrier to bring each blank into operative relation with the cutter, means for holding and rotating each blank as it is cut, and a clamping member to clamp the blank in the seat next to the seat in operative relation to the shaping cutter during the operation of shaping each blank, and means for actuating said clamping member to clamp each blank and release it when the cutting operation on the next blank is finished.

10. In an automatic machine, a shaping cutter, a carrier having seats for blanks, means for moving the carrier intermittently to bring each blank into operative relation to the cutter, means for holding and rotating each blank in cutting position, including a shiftable center, a clamping member alined during each cutting operation with the seat next, on one side of the seat in operative relation to the cutter, an abutment at the other end of the seat, and means for moving the shiftable center to engage and disengage the blanks to be shaped and causing the clamping member to approach the abutment to clamp the blank in said seat during the operation of shaping the next blank and release it at the end of such operation.

11. In an automatic machine, a shaping cutter, a carrier having seats for blanks, means for moving the carrier to bring the blanks into operative relation with the cutter, means for holding and rotating each blank in cutting position, including a shiftable center, and means for actuating the shiftable center to clamp each blank as it comes to cutting position, a clamping member secured to the shiftable center and alined with the seat on one side of the seat in operative relation to the cutter, a yielding abutment at the other end of the seat.

12. In an automatic machine, a cutter, a carrier having seats for blanks, means for moving the carrier to bring the blanks into operative relation to the cutter, means for holding and rotating each blank in operative relation to the cutter, a shiftable center, a yielding clamping member secured to the shiftable center and alined with the seat on each side of that in operative relation to the cutter, an abutment at the other end of each seat, and means for actuating both the shiftable center and the clamping members to clamp one blank between the centers and the blank on each side of it between the clamping members and the abutment.

13. In an automatic machine, a shaping cutter, a carrier having seats for blanks, means for moving the carrier to bring each seat in turn into operative relation to the cutter, means for holding and rotating each blank in cutting position, including a live and a shiftable center, clamping members secured to the shiftable center and alined one with a seat on each side of that in operative relation to the cutter, an abutment at the other end of each said seat, the abutment at the end of the front seat being resilient.

14. In a machine for making clothes pins and the like, a cutter, a carrier having seats for blanks, means for actuating the carrier to bring the seats in turn into operative relation to the cutter, and means for removing the blanks from the seats consisting of a cam in the path of the blanks overlying the carrier surface and inclined in a plane transverse to the direction of the path of the seats and parallel to the length of the seats.

15. In a machine for turning wooden articles, a cutter, a carrier having seats for blanks, means for actuating the carrier to bring the seats in turn into operative relation to the cutter, and means for removing the blanks from the seats consisting of a cam in the rear of the cutter in the path of the blanks, overlying the carrier surface, and inclined in a plane transverse to the path of the seats and parallel to the length of the seats, and a cam slightly in the rear of the said cam curved in a plane at right angles to the length of the seats.

16. In a machine for turning wooden articles, a cutter, a cylindrical carrier having seats for blanks, means for actuating the carrier to bring the blanks in turn into operative relation to the cutter, a cam in the path of the blanks in the rear of the cutter, overlying the carrier surface, curved in a cylindrical plane transverse to the path of the blanks, and a cam slightly in the rear of the said cam inclined in a plane at right angle to the axis of the carrier.

17. In a machine for turning wooden articles, a cutter, a cylindrical carrier having on its surface seats for the blanks, means for actuating the carrier to bring the blanks in turn into operative relation to the cutter, a cam extending into the path of the blanks overlying the carrier surface behind the cutter and inclined in a cylindrical plane from one side of the path of the blanks to the other side to displace the blanks transversely to their path in the direction of their length, and a cam in the path of the blanks thus displaced inclined in a plane at right angles to the axis of the carrier.

18. In a machine for making clothes pins; a slotting cutter and a shaping cutter; a carrier having seats for blanks, each seat having an opening to receive the slotting cutter and to permit exit of shavings, etc.; means for actuating both cutters; a funnel inclosing the shaping cutter and having its mouth disposed toward the carrier; a funnel having its mouth adjacent the carrier on the side opposite the seats and opposite to the mouth of the first mentioned funnel, and means for exhausting air from both funnels.

Signed by us at Richmond, Virginia, this 20th day of March 1909.

EDWARD W. TURNER.
HERMAN S. REAMS.

Witnesses:
W. A. BOYD,
SAMUEL W. CREWS.

---

Copies of this patent may be obtained for five cents each, by addressing the "Commissioner of Patents, Washington, D. C."